United States Patent [19]
Bliek

[11] 3,936,077
[45] Feb. 3, 1976

[54] TONNEAU COVER FOR FIFTH WHEEL CAMPER TRUCKS

[76] Inventor: Arie Bliek, 903 Grand, Emmetsburg, Iowa 50536

[22] Filed: Mar. 4, 1974

[21] Appl. No.: 447,790

[52] U.S. Cl............ 280/423 R; 296/100; 296/137 B
[51] Int. Cl.²...................... B62D 53/00; B60J 7/10
[58] Field of Search......... 280/423 R; 296/100, 107, 296/102, 104, 105, 137 R, 137 B

[56] References Cited
UNITED STATES PATENTS

| | | | |
|---|---|---|---|
| 2,925,286 | 2/1960 | Hodges, Jr. et al. | 296/423 R X |
| 3,390,896 | 7/1968 | Philapy | 280/423 R |
| 3,485,524 | 12/1969 | Nelson | 296/100 |
| 3,572,821 | 3/1971 | Antwerp | 296/137 B |
| 3,727,972 | 4/1973 | Belk | 296/137 R |
| 3,765,717 | 10/1973 | Garvert | 296/137 B |
| 3,791,674 | 2/1974 | Berends | 280/423 R |

*Primary Examiner*—M. Henson Wood, Jr.
*Assistant Examiner*—R. Schrecengost
*Attorney, Agent, or Firm*—Zarley, McKee, Thomte & Voorhees

[57] ABSTRACT

A tonneau cover for a fifth wheel camper truck is disclosed comprising a supporting frame which is secured to the upper ends of the wall members of the truck box and having a cover extending thereover. The supporting frame comprises a pair of side frame members which are positioned on the upper ends of the side walls of the box, a front frame member extending between the forward ends of the side frame members and a back frame member which extends between the rearward ends of the side frame members. A plurality of spaced apart cross members extend between the side frame members and are arched so that the centers dwell in a plane above the ends thereof. The cover is secured at its periphery to the side frame members by snaps or the like and has an opening formed in the central portion thereof positioned above the fifth wheel mounted in the truck box so that the king pin of a trailer may extend downwardly therethrough. A cap is detachably secured to the cover so as to close the opening during the time that the truck is not being used to pull a trailer. A zipper extends from the rearward end of the cover to the opening so that the cover may be installed on the truck or removed therefrom without disconnecting the truck from the trailer.

10 Claims, 4 Drawing Figures

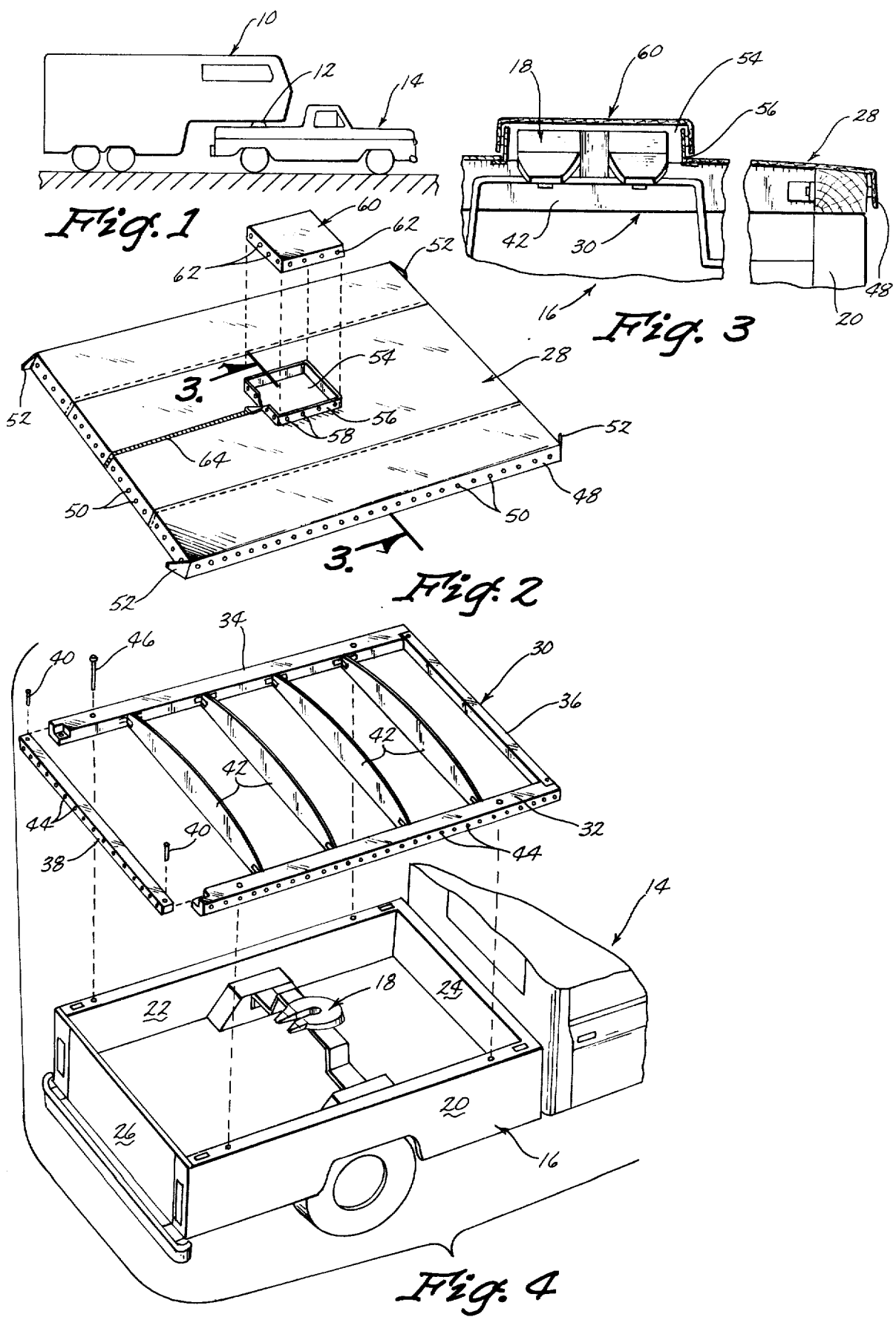

TONNEAU COVER FOR FIFTH WHEEL CAMPER TRUCKS

BACKGROUND OF THE INVENTION

This invention relates to a tonneau cover and more particularly to a tonneau cover for use on fifth wheel camper trucks.

Fifth wheel camper trucks are becoming more and more popular due to the expansion of the recreational vehicle industry. The fifth wheel camper trucks ordinarily have a fifth wheel positioned in the box while the trailer has a king pin extending downwardly from the forward end thereof which is connected to the fifth wheel.

Since the truck box is not covered in conventional fifth wheel camper trucks, light objects will be blown therefrom or will become wet if it should rain. Further, wind resistance builds up in the truck box which decreases gas mileage.

Therefore, it is a principal object of this invention to provide a tonneau cover for fifth wheel camper trucks.

A further object of the invention is to provide a tonneau cover for fifth wheel camper trucks which includes a supporting frame secured to the truck box.

A further object of the invention is to provide a tonneau cover for a fifth wheel camper truck which prevents objects in the truck from being blown therefrom or becoming wet.

A further object of the invention is to provide a tonneau cover for fifth wheel camper trucks including means for closing the opening through which the king pin of the trailer normally extends.

A further object of the invention is to provide a tonneau cover for fifth wheel camper trucks which may be removed from the truck or installed thereon without disconnecting the truck from the trailer.

A further object of the invention is to provide a tonneau cover for fifth wheel camper trucks which is economical of manufacture and durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a side view of a conventional fifth wheel camper truck pulling a trailer;

FIG. 2. is an exploded perspective view of the tonneau cover of this invention;

FIG. 3 is an enlarged fragmentary sectional view seen on lines 3—3 of FIG. 2; and FIG. 4 is an exploded perspective view of the supporting frame for the tonneau cover and its relationship with the truck box.

DESCRIPTION OF THE PREFERRED EMBODIMENT

The numeral 10 refers generally to a fifth wheel trailer having a king pin 12 extending downwardly from the lower forward end thereof. The numeral 14 refers to a conventional fifth wheel camper truck generally including a box 16 and a fifth wheel mechanism 18 mounted therein. Box 16 comprises a pair of spaced apart side walls 20 and 22, front wall 24 and tail gate 26.

The tonneau cover of this invention is referred to generally by the reference number 28 and includes the supporting frame 30 seen in FIG. 4. Support frame 30 comprises a pair of side frame members 32 and 34 having a front frame member 36 secured to and extending between the forward ends thereof. A rear frame member 38 is detachably secured to the rearward ends of the side frame members 32 and 34 by means of pins 40 as illustrated in FIG. 4. A plurality of cross frame members 42 are secured to and extend between the side frame members 32 and 34 by any conventional means. As seen in the drawings, the cross frame members are arched so that the centers dwell in a plane above the ends to aid in draining water from the cover. The supporting frame 30 is provided with a plurality of snap fasteners 44 as seen in FIG. 4 to permit the cover 28 to be secured thereto. Supporting frame 30 is secured to the box 16 by means of bolts 46 as illustrated in FIG. 4.

Cover 28 is preferably constructed of a vinyl material with twill backing so as to achieve the necessary flexibility and strength. Cover 28 is provided with downwardly extending flap portions 48 provided at the periphery thereof including snap fasteners 50 adapted to be secured to the snap fasteners 44. As seen in FIG. 2, the flap portions are provided with end portions 52 which may be secured to the adjacent flap portion to affect a water tight seal at the corners of the cover.

Cover 28 is provided with an opening 54 as illustrated in FIG. 2. The numeral 56 refers to an upstanding support in the form of belting or the like which is secured to the cover and which extends around the opening 54 as illustrated in the drawings. A plurality of snap fasteners 58 are provided on the upstanding member 56 to permit the cap 60 to be secured thereto by means of the snap fastners 62 provided thereon. As seen in FIG. 3, cap 60 is provided with downwardly extending side portions which receive the upstanding support 56. A zipper extends from the opening 54 to the rearward end of the cover for a purpose to be described in more detail hereinafter.

The supporting frame 30 is installed on the vehicle as previously described. As also previously described, frame member 38 is detachably connected to the side frame members 32 and 34 and it is preferred that the two cross frame members 42 at the rear of the supporting frame 30 also be quickly detachably connected to the side frame members 32 and 34 so that the supporting frame 30 can be mounted on the box without the necessity of disconnecting the trailer from a truck. In other words, the supporting frame 30 could be slipped beneath the forward end of the trailer and positioned on the box with the two rear cross frame members 42 and the rear frame member 38 then being connected to the supporting frame.

Cover 28 is simply secured to the supporting frame 30 by means of the snap fasteners as previously described. If the trailer is connected to the truck, zipper 64 is opened to permit the cover to be slipped around the downwardly extending king pin 12. The upstanding member 56 is closely positioned beneath the lower forward portion of the trailer and prevents moisture from entering the box. When the trailer is not connected to the truck, the cap 60 may be secured to the upstanding members 56 to seal the opening 54.

Thus it can be seen that a unique tonneau cover has been provided for a fifth wheel camper truck which prevents objects in the truck box from becoming wet or from becoming blown therefrom. The tonneau cover of this invention also prevents wind resistance from building up in the truck box. Thus it can be seen that the tonneau cover of this invention accomplishes at leat all of its stated objectives.

I claim:

1. In combination with a truck having a box defined by upstanding walls and a fifth wheel means positioned in said box, comprising, a flexible tonneau cover, and fastening means operatively securing the periphery of said cover to said walls so that said cover extends thereover, said cover having an opening formed therein above said fifth wheel means so that the king pin of a trailer means may extend downwardly through said cover and downwardly into said box to said fifth wheel means, said opening being positioned at the longitudinal center line of said box when said cover is mounted on said walls.

2. The combination of claim 1 wherein a cover supporting frame is secured to the upper ends of said walls, said cover being secured to said supporting frame.

3. The combination of claim 1 wherein a cap means is selectively detachably secured to said cover so as to close said opening at times.

4. In combination with a truck having a box defined by upstanding walls and a fifth wheel means positioned in said box, comprising, a flexible tonneau cover, fastening means operatively securing the periphery of said cover to said walls so that said cover extends thereover, said cover having an opening formed therein above said fifth wheel means so that the king pin of a trailer means may extend downwardly to said fifth wheel means, a cover supporting frame secured to the upper ends of said walls, said cover being secured to said supporting frame, said walls comprising front, back and spaced apart side wall members, said supporting frame comprising a pair of side frame members which are detachably mounted on the upper ends of said side wall members, said frame members having rearward and forward ends, a front frame member secured to and extending between the front ends of said side frame members, a rear frame member secured to and extending between the rearward ends of said side frame members, and a plurality of spaced apart cross frame members secured to and extending between said side frame members.

5. The combination of claim 4 wherein said rear frame member is detachably secured to said side frame members.

6. The combination of claim 4 wherein said cross frame members are arched so that centers thereof dwell in a plane above the ends thereof.

7. The combination of claim 5 wherein at least some of said cross frame members at the rear end of said supporting frame are detachably secured to said side frame members.

8. In combination with a truck having a box defined by upstanding walls and a fifth wheel means positioned in said box, comprising, a flexible tonneau cover, fastening means operatively securing the periphery of said cover to said walls so that said cover extends thereover, said cover having an opening formed therein above said fifth wheel means so that the king pin of a trailer means may extend downwardly to said fifth wheel means, a cap means selectively detachably secured to said cover so as to close said opening at times, an upstanding support secured to said cover adjacent said opening, said cap means being detachably secured to said upstanding support.

9. In combination with a truck having a box defined by upstanding walls and a fifth wheel means positioned in said box, comprising, a flexible tonneau cover, fastening means operatively securing the periphery of said cover to said walls so that said cover extends thereover, said cover having an opening formed therein above said fifth wheel means so that the king pin of a trailer means may extend downwardly to said fifth wheel means, said cover having an elongated slit formed therein extending from said opening to one of its sides so that said cover may be installed on said truck or removed therefrom without disconnecting the trailer from the truck.

10. The combination of claim 9 wherein a zipper means is provided on said cover for closing said elongated slit.

* * * * *